July 4, 1967  D. M. HARRIS  3,329,527
GRAPHITE HEATING ELEMENTS AND METHOD OF CONDITIONING
THE HEATING SURFACES THEREOF
Filed Sept. 13, 1963  6 Sheets-Sheet 1

INVENTOR.
DARREL M. HARRIS
BY *Robert J. Schaap*

ATTORNEY

|←1MM→|

FIG. 3

|←100μ→|

FIG. 4

|←100μ→|

FIG. 5

|←100μ→|

FIG. 6

|←100μ→|

FIG. 7

|←100μ→|

July 4, 1967 D. M. HARRIS 3,329,527
GRAPHITE HEATING ELEMENTS AND METHOD OF CONDITIONING
THE HEATING SURFACES THEREOF
Filed Sept. 13, 1963 6 Sheets-Sheet 4

INVENTOR
DARREL M. HARRIS
BY *Robert J. Schaap*
ATTORNEY

United States Patent Office 3,329,527
Patented July 4, 1967

3,329,527
GRAPHITE HEATING ELEMENTS AND METHOD OF CONDITIONING THE HEATING SURFACES THEREOF
Darrel M. Harris, Glendale, Mo., assignor to Monsanto Company, St. Louis, Mo., a corporation of Delaware
Filed Sept. 13, 1963, Ser. No. 308,859
16 Claims. (Cl. 117—228)

This invention relates in general to certain new and useful improvements in heating elements and more particularly, to a method of sealing the heating surfaces of such heating elements.

In recent years, semi-conductor devices formed of silicon or various combinations of silicon with other elements, have found widespread use in the electronics industry. Many of these semi-conductor devices are formed from silicon wafers which are surface treated in epitaxial silicon furances. The silicon wafers are placed upon a graphite heating element forming part of the epitaxial silicon furnace and are heated to approximately 1140° C. Following this, a mixture of relatively hot hydrogen and trichlorosilane is passed over the wafers. The hydrogen reacts with the trichlorosilane to form free silicon which deposits as a film on the surface of the wafers.

To be suitable for use in the subsequent manufacture of semi-conductor elements, the silicon wafers must have an unusually high degree of purity. However, the graphite heating elements are rather porous and when subjected to high temperatures will emit considerable amounts of gas. This gas often reacts with the silicon wafer causing surface imperfections. Moreover, this emitted gas tends to interfere with the reaction between the hydrogen and trichlorosilane. Furthermore, the gas which is expelled by the heating element often carries impurities which might be contained in the heating element.

In order to overcome these defects, it has been necessary to degas the graphite heating element prior to actual use. This has been performed by heating the graphite heating element in an epitaxial silicon furnace for a length of time which is equivalent to the time required to perform silicon film deposition on the wafers. Moreover, this operation must be repeated at least five or six times to assure complete degassing of the graphite heating element. This method not only results in unproductive lost time of the epitaxial silicon furnace, but consumes considerable labor cost as well.

There have been various attempts in the prior art to coat the heating surface of the graphite heating elements in order to eliminate these time consuming and costly degassing operations. Some of these attempts included the passing of the trichlorosilane in hydrogen gases over the hot graphite heating element and reacting the gases in order to deposit a silicon film on the heating element. To date, these attempts to coat the surface of the heating element by film deposition have been largely unsuccessful. The gases were reacted at the normal operating temperature or 1140° C. and this resulted in a film of silicon which was deposited on the heating element, but did not in any way become fused to the surface of the graphite. Moreover, the silicon film remained rather pervious and therefore did not seal the gas contained within the graphite heating element.

It is therefore the primary object of the present invention to provide a method of treating the surfaces of a graphite heating element with a silicon film which renders the heating element completely impervious to the passage of gas.

It is another object of the present invention to provide a method of applying a silicon film to the surface of a graphite heating element and which results in a substantially permanently fused protective layer.

It is also an object of the present invention to provide a method of bonding a silicon film to the surface of a graphite heating element where the film does not interfere with the electrical properties or the heating capacity of the heating element.

It is an additional object of the present invention to provide a method of the type stated which is relatively easy and inexpensive to perform and requires a minimum of non productive labor time.

It is a further object of the present invention to provide a heating element having a gas impervious film fused to its exterior surfaces.

With the above and other objects in view, my invention resides in the novel features of form construction, arrangement, and combination of parts presently described and pointed out in the claims.

According to the present invention it has been found that by fusing a silicon film to the surface of the graphite heating element, and actually reacting the silicon with the graphite heating element a tightly adherent, substantially permanent, gas impervious film is attained. Trichlorosilane gas is reacted with hydrogen at a temperature below the melting point of silicon and free silicon is produced according to the reaction:

$$H_2 + HSiCl_3 \rightarrow 3HCl + Si$$

The silicon which is produced in the reaction between the gases is deposited on the surface of the graphite heating element. The temperature of the heating element is increased to raise the temperature of the silicon deposited thereon, above the melting point of silicon. At this temperature, the silicon partially reacts with heating element to form a silicon carbide film. The remainder of the silicon penetrates into the pores of the graphite and becomes fused to the graphite and thereby forms a layer which prevents outgassing during subsequent heating of the graphite heating element. As used herein, the term "fusing" refers to a physical and chemical bonding to the carbon atoms forming the graphite heating element.

Figure 1:
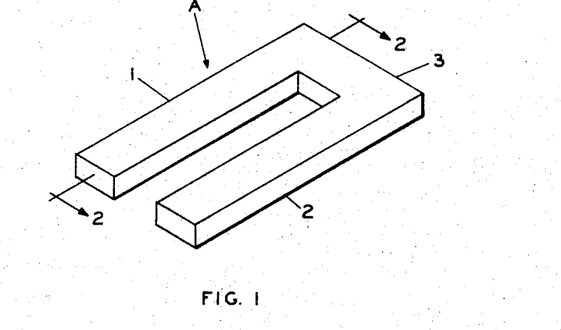
FIGURE 1 is a perspective view of a graphite heating element which has been surface treated in accordance with the present invention.
Figure 2:
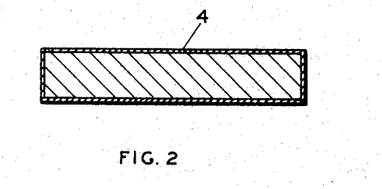
FIGURE 2 is a vertical sectional view taken along line 2—2 of FIGURE 1.

Referring now in more detail and by reference characters to the drawings, A designates a graphite heating element or so-called "bridge," consisting of a pair of horizontal legs 1, 2, connected by a bight portion 3. The construction of the graphite heating element A is conventional and is therefore not described in detail herein. However, it will suffice to point out that the legs 1-2 have a length within the range of 24 to 36 inches and have a thickness of approximately ⅜ to ½ inch.

In accordance with the present invention, the heating element A is suitably connected to the electrical contacts of an epitaxial silicon furnace (not shown), and enclosed within a gas-tight bell jar or so-called "hat" (also not shown). Relatively hot gaseous trichlorosilane and relatively pure hydrogen is passed into the bell jar and reacted according to above reaction at approximately 1140° C. to produce hydrogen chloride which is vented from the bell jar, an elemental silicon which is deposited on the heating element A. Approximately 8.1 grams of trichlorosilane and 210 liters of hydrogen were passed into the bell jar and reacted for approximately 15 minutes to produce a silicon film 4 on the surface of the heating element A. The resultant film had an electrical resistivity of approximately 1 to 2 ohm centimeters and a film thickness of approximately 0.0070 inch. The film does not in any way become fused to the graphite. X-ray diffraction analyses have shown that this film does not materially react with the graphite and the penetration into the pores of the graphite is so slight as to be negligible. It should be understood that it is possible to produce the silicon by these conventional methods such as the reduction of silicon chloride according to the following reaction:

$$SiCl_4 + 2H_2 \rightarrow Si + 4HCl$$

After the initial coating of elemental silicon, the bridge A is heated to a temperature within the range of 1420° to 2000° C. for 2 minutes. The preferred temperature range is 1500–1550° C., which is considerably higher than the 1420° C. melting point temperature of elemental silicon. At this temperature, the silicon melts and diffuses into the pores of the graphite and moreover, actually becomes bonded to the graphite. X-ray diffraction analyses have shown that approximately 9.0 percent of the elemental silicon reacts with the graphite to form beta-silicon carbide up to a depth of about 0.015 inch. Thereafter, the amount of silicon carbide formation reduces with depth into the graphite. This amount of beta-silicon carbide formation is naturally affected somewhat by the amount of silicon deposited on the surface of the graphite. After the fusion process, the trichlorosilane gas and hydrogen is then passed into the bell jar for an additional 15 minute period at approximately 1140° C. for depositing an additional coating of elemental silicon on the surface of the heating element A, thereby forming a protective gas impervious silicon layer 4. Electron probe microanalyses have shown that the silicon penetrates approximately one-tenth millimeter by this process.

It has been found possible to produce a much heavier film of silicon by repeating the above process. In this latter process, the bridge is originally coated for 15 minutes in the manner previously described, heated to the range of 1500–1550° C. for 2 minutes thereby causing penetration of the elemental silicon and fusion with the graphite. An additional 15 minute coating period then follows at 1140° C. Following this, the bridge is then heated to 1500–1550° C. causing fusion of this second layer of silicon. The bridge is then coated for an additional one hour at 1140° C. and again fused at 1500–1550° C. Following this, an additional coating is applied at 1140° C. for one hour, the coating is fused at 1500–1550° C. for 2 minutes, and followed by a final coating at 1140° C. for one hour. Electron probe microanalyses have shown that films applied in this manner penetrate into the graphite as much as 0.045 inch. Moreover, approximately 9.0 percent of the silicon reacts with the graphite to form beta-silicon carbide, up to a depth of 0.015 inch and the film has an overall thickness of approximately 0.0075 inch.

It has been found, that bridges coated in this manner give far superior results than bridges which were coated with elemental silicon at 1140° C. without fusing the silicon into the graphite. When elemental silicon was deposited on bridges and not fused, the films thus produced were poor, substantially pervious to gas and did not prevent contamination of wafers by the graphite heating element. Moreover, the commercial life of the bridges having unfused coatings of silicon was substantially shorter than where the coating of silicon was fused. It has been established by various tests that bridges coated and not fused with silicon were useful for approximately twelve commercial runs whereas bridges coated and fused with silicon had a useful life of approximately fifty runs. Moreover, bridges which were coated and fused with silicon had a film resistivity varying between 45 and 62 ohm-centimeters, whereas bridges having a deposited layer of unfused silicon had film resisitivities varying between 1 and 2 ohm-centimeters.

Figure 3:
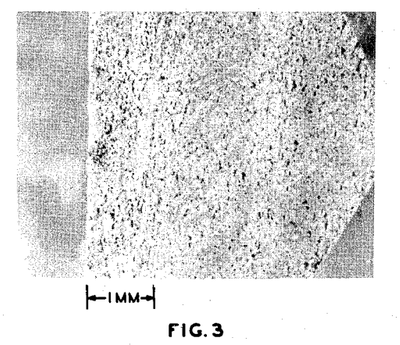
FIGURE 3 is a reproduction of an optical micrograph taken at fifteen times actual size of a sample from a graphite heating element.

The sample in the optical micrograph of FIGURE 3 was removed from a graphite heating element and polished before an electron-probe microanalysis was performed.

The graphite heating element from which the sample of FIGURE 3 was removed, was vacuum heated at 1140° C. for one-half hour in an epitaxial silicon furnace. Trichlorosilane and hydrogen gases were reacted at 1140°/ C. for fifteen minutes there following, to produce elemental silicon which was deposited on the surface of the heating element. The temperature was then raised to a temperature within the range of 1500–1550° C., where the silicon melted and diffused into the pores of the graphite and thence became bonded thereto. Some of the silicon reacted with the carbon atoms of the graphite forming beta-silicon carbide. Following this, trichlorosilane and hydrogen were again reacted for fifteen minutes at 1140° C. to produce an outer coating of elemental silicon. By reference to FIGURE 5, it can be seen that the silicon penetrated to a depth in the graphite of almost 200 microns. The light areas in the electron scattering image of FIGURE 4 indicate voids within the graphite and by comparing FIGURE 4 with the X-ray image of FIGURE 5, it can be seen that the silicon tended to fill these voids. Moreover, by reference to FIGURE 5, it can be seen that an almost impervious outer coating of silicon was formed on the outer surface of the sample and hence of the graphite heating element.

Figure 4:
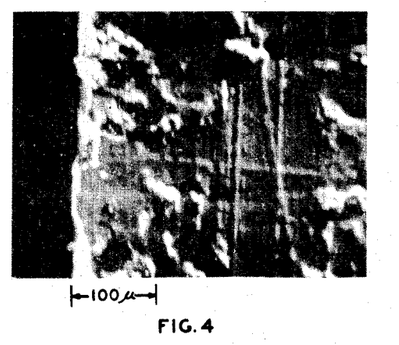
FIGURE 4 is a reproduction of an electron scattering image of the sample of FIGURE 3, when the latter is provided with a silicon coating fused to the surface thereof.
Figure 5:
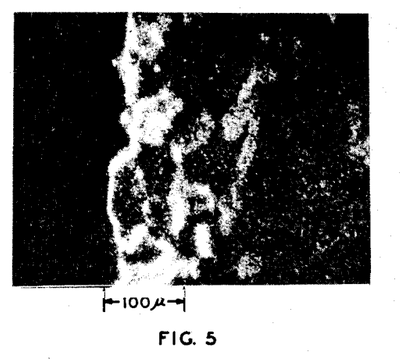
FIGURE 5 is a reproduction of an X-ray image of the sample of FIGURE 3 when the latter was provided with a silicon coating fused to the surface thereof.

The scattered electron image of FIGURE 4, the X-ray image of FIGURE 5 and the remainder of the scattered electron images and X-ray images appearing in FIGURES 6 through 14 were performed on a scanning electron-probe X-ray micro-analyzer. To obtain the scattered electron images, the electrons are back-scattered from the specimen and detected by a scintillation counter. The signal is used to/form an image on a display tube which can be photographed. This scattered-electron image shows the topographical detail similar to an optical image by oblique elimination and is useful to identify the region which was scanned for subsequently producing the X-ray image. The X-ray images produced are magnified plots of the intensity of X-rays emitted from the specimen surface as the electron-probe scans through a raster pattern. The spectophotometer forming part of the electron-probe micro-analyzer, is normally set for a characteristic emission line of a chosen element so that the contrast in the X-ray image portrays the concentration distribution of that particular element. In the present case, the spectrophotometer is set to record the characteristic emission lines of silicon. All of the samples analyzed in the electron-probe micro-analyzer were polished and then cleaned. The magnification used to produce the scattered electron images and the X-ray images were 200 times the actual size of the sample from which obtained. The electron-probe micro-analyzer employed an argon-methane flow counter at 1934 volts used a minimum scanning line speed of 5 frames per second and X-ray contrast of 7.6 and a brightness of 0.8.

Figure 6:
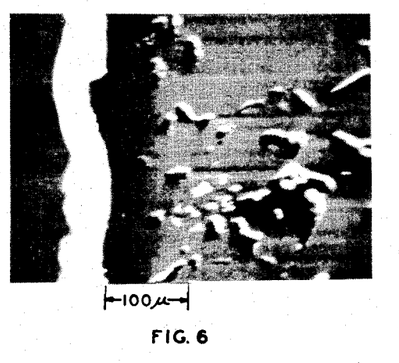
FIGURE 6 is a reproduction of an electron scattering image of a sample similar to the sample of FIGURE 3 and taken from a heating element where silicon film was deposited on the surface, rather than being fused to the surface thereof.
Figure 7:
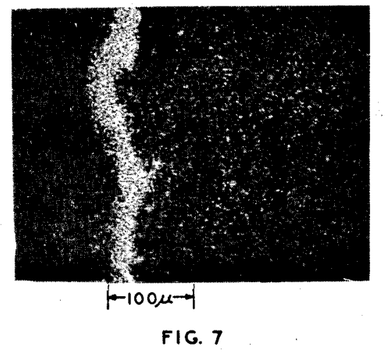
FIGURE 7 is a reproduction of an X-ray image of the sample of FIGURE 6 and showing degree of penetration of silicon.
Figure 8:
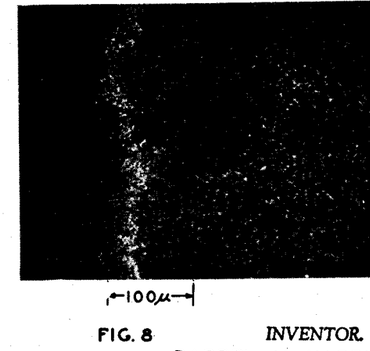
FIGURE 8 is a background X-ray image of the sample used to make a scattered electron image of FIGURE 6 and the X-ray image of FIGURE 7.

The graphite heating element used to produce the sample of FIGURES 6, 7 and 8 was vacuum heated in an epitaxial silicon furnace for 1½ hours at 1140° C. and coated with silicon for ½ hour at 1140° C. Again, the silicon coating was the reaction product of trichlorosilane and hydrogen gases which were reacted at this temperature to produce the elemental silicon deposited on the surface of the heating element. Inasmuch as the temperature was not raised to the melting point of silicon, the elemental silicon did not melt and therefore did not become bonded or fused to the graphite heating element. FIGURE 6 is a reproduction of the scattered electron image of the sample just described and showing the surface contour thereof. FIGURE 7 is a reproduction of an X-ray image of the sample which was used to produce the scattered electron image of FIGURE 6. FIGURE 8 is a background X-ray image of the area examined and discloses that some of the enhancement along the edge of the sample, is due to topographical effect. FIGURE 8, when visually compared with FIGURE 7, indicates that the concentration of silicon along the edge of the sample is not nearly as great as it appears to be by direct reference to FIGURE 7 alone. Much of this additional enhancement which appears in FIGURE 7 and, hence, which is the effect in FIGURE 8 is a result of the condition known as "white-radiation." When comparing FIGURES 7 and 8, it can be seen that there is very little penetration into the pores of the graphite, when the silicon is not melted and bonded to the graphite as was the case with the sample of FIGURE 3. Moreover, it can be seen that the coating which actually adheres to the surface of the sample is rather light and somewhat gas previous.

Figure 9:
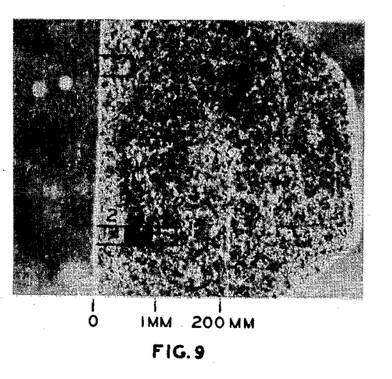
FIGURE 9 is a reproduction of an optical micrograph of a sample from a graphite heating element, taken at fifteen times actual size and where the heating element is provided with a heavy silicon coating fused to the surface thereof.

The graphite heating element from which the sample of FIGURE 9 was removed, was vacuum heated in an epitaxial silicon furnace for one-half hour at 1140° C. Trichlorosilane and hydrogen gases were then reacted at 1140° C. for fifteen minutes to produce a coating of elemental silicon on the surfaces of the heating element. Following this, the temperature of the heating element was raised to 1500–1550° C. where the silicon melted and penetrated into the pores of the graphite and became bonded thereto. Trichlorosilane gas and hydrogen were again reacted at 1140° C. for fifteen minutes to produce another coating of silicon. The heating element was raised to a temperature within the range of 1500–1550° C. for two minutes where the silicon melted and penetrated into the pores of the graphite. Following this, another coating of silicon was deposited at 1140° C. for one hour. Following this, the coating was fused at 1550° C. for two minutes and then followed by an additional coating of elemental silicon formed by the reaction of trichlorosilane and hydrogen at 1140° C. for one hour.

Figure 10:
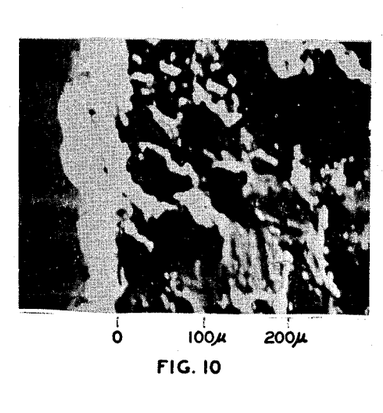
FIGURE 10 is a reproduction of a scattered electron image of the field designated as 1 in FIGURE 9.
Figure 11:
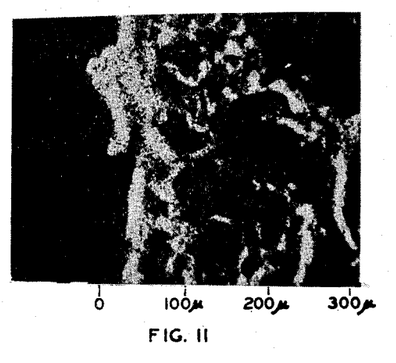
FIGURE 11 is an X-ray image of the field designated as 1 in the sample of FIGURE 9.
Figure 12:
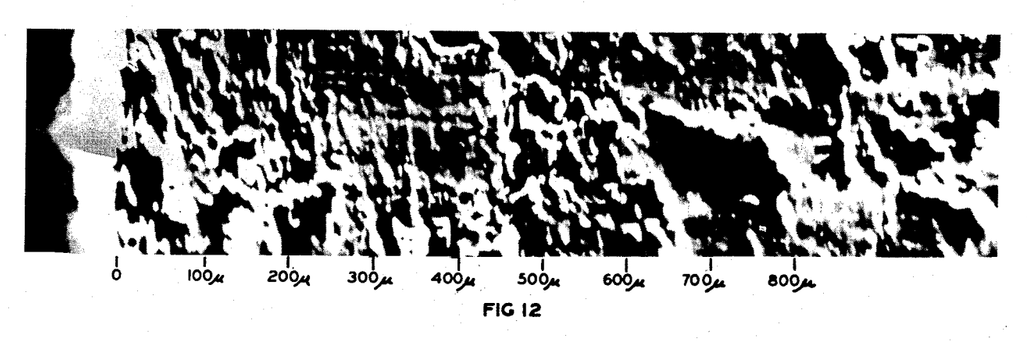
FIGURE 12 is a scattered electron image of the fields designated as 2, 3, and 4 in the sample of FIGURE 9.
Figure 13:
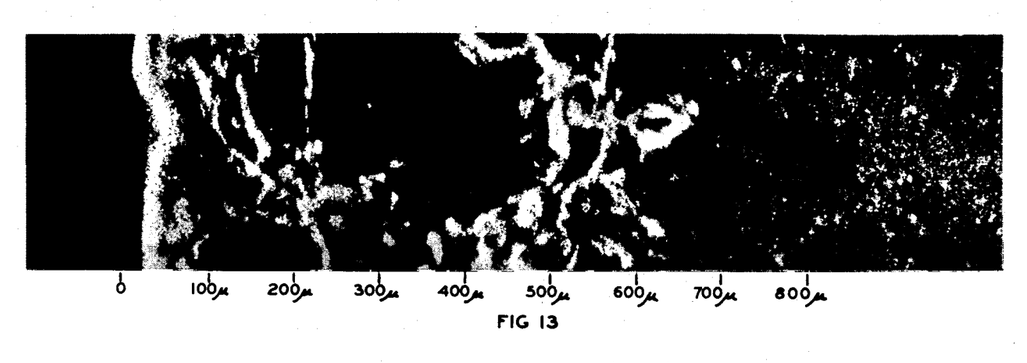
FIGURE 13 is a reproduction of an X-ray image of the fields designated as 2, 3, and 4 in the sample of FIGURE 9.
Figure 14:
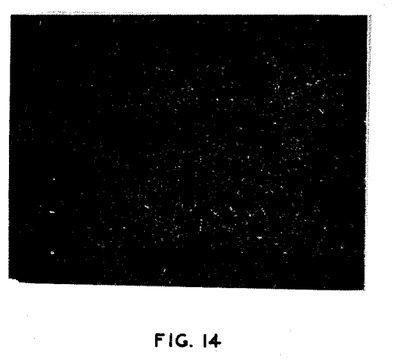
FIGURE 14 is a background X-ray image of the field designated as 4 in the sample of FIGURE 9.

FIGURE 9 is a reproduction of an optical micrograph of this sample and illustrated thereon are fields 1, 2, 3 and 4 which were subsequently examined. FIGURE 10 is a scattered electron image of the field designated as 1 and shows the topography of the sample at this point. FIGURE 11 is an X-ray image of field 1 and discloses the heavy layer of silicon on the surface of the sample, and the lesser amounts of silicon which penetrated into the pores of the graphite. It can be seen, however, that the concentration of silicon within the pores of the graphite is much greater than the concentration in the sample of FIGURE 3 which is illustrated in the X-ray image of FIGURE 5. FIGURE 12 is a scattered electron image of fields 2, 3, and 4 of the sample in FIGURE 9. FIGURE 13 is an X-ray image of fields 2, 3, and 4. It can be seen, by reference to this figure, that the silicon penetrated into the pores of the graphite to a depth of almost 750 microns in great concentrations. FIGURE 14 is a background X-ray image of field 4 illustrating the amount of white effect "white-radiation" which appeared in the X-ray image of FIGURE 13. Consequently, visual comparison of field 4 in FIGURE 13 and FIGURE 14 would indicate the amount of silicon actually present in field 4. In effect, it can be seen that beyond a depth of 700 microns, there is practically no silicon present.

Figure 15:
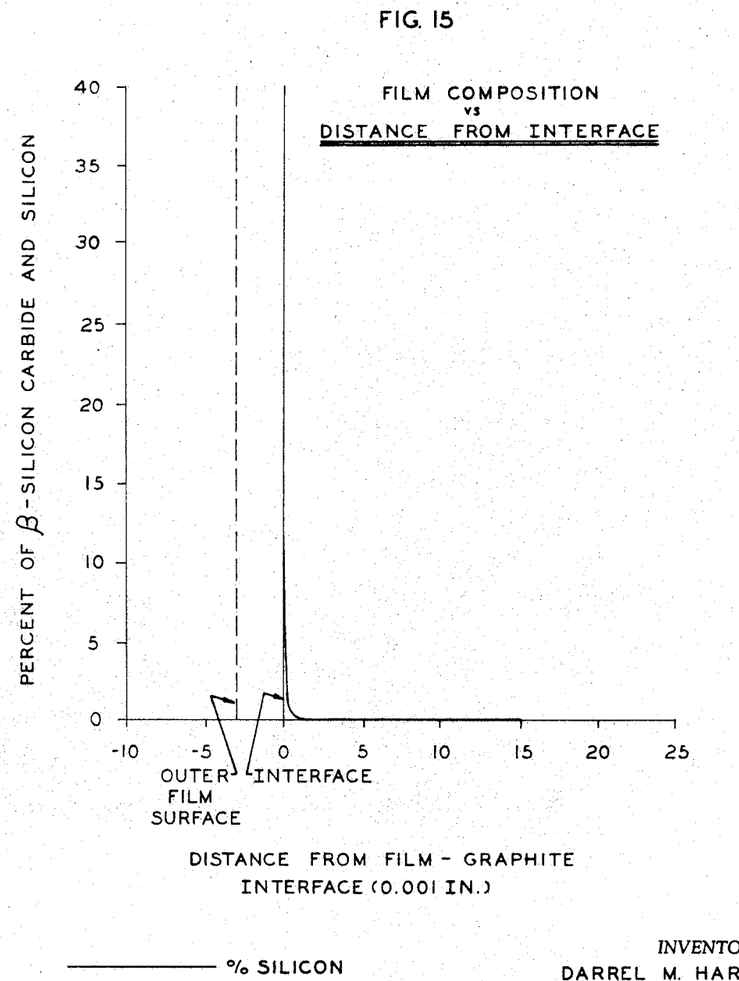
FIGURE 15 is a graph showing the composition of silicon and silicon carbide in the heating element as a function of the distance from the film graphite interface.

The graph of FIGURE 15 discloses the amount of silicon penetration and silicon carbide formation when the heating element is provided with a silicon coating without being fused to the graphite. The graph of FIGURE 16 discloses the amount of silicon penetration and silicon carbide formation when the heating element is provided with a silicon coating which has been fused in accordance with the present invention. The data for the plot of FIGURE 15 was obtained from an X-ray defraction analysis on the sample of FIGURE 6, where the silicon film was not fused to the surface of the graphite. The data was corrected for the differences in mass absorption co-efficients between the components of the sample, that is to say, the data was corrected for the atomic scattering co-efficients of silicon and carbon since these elements have a different ability to defract, due to their difference in atomic weights. By reference to FIGURE 15, it can be seen that a coating of approximately 0.003 inch was formed on the exterior surface of the graphite. By further reference to this figure, it can be seen that the silicon penetrated the graphite to a depth of approximately .0015 inch and moreover, no silicon carbide formation was observed.

Figure 16:
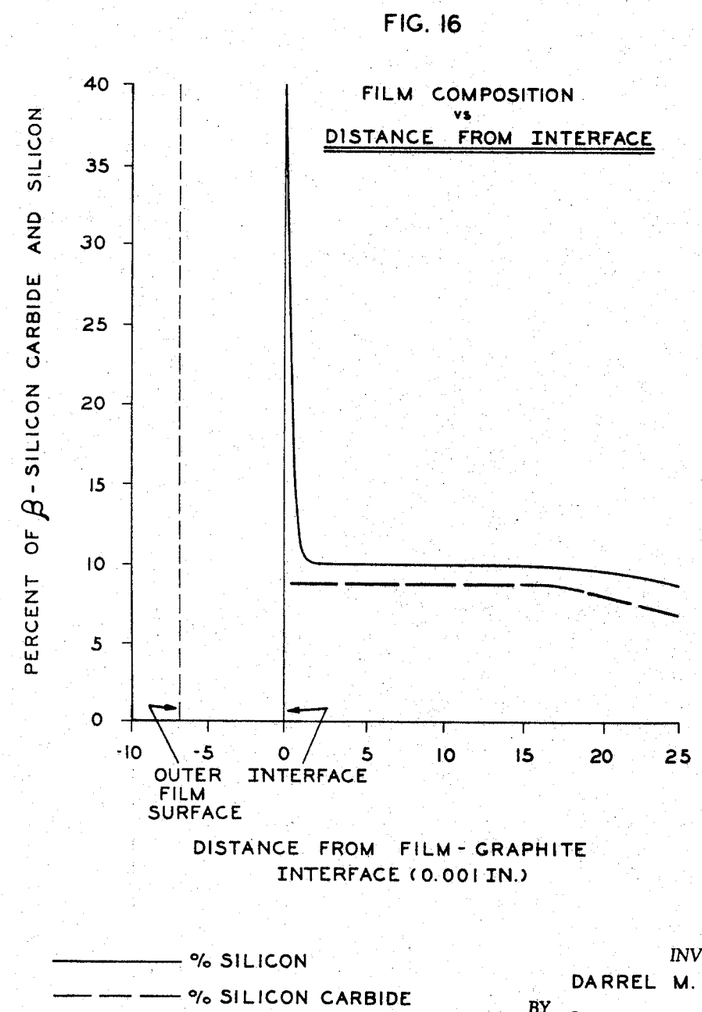
FIGURE 16 is a graph showing the composition of silicon and silicon carbide in the heating element as a function of the distance from the film graphite interface, when the heating element is provided with a heavy fused coating of silicon on its exterior surface.

The data for the graph of FIGURE 16 was obtained from the sample of FIGURE 9, which was provided with a heavy coating of silicon bonded to the surface of the graphite. The data was also corrected for atomic scattering co-efficients. It can be seen that a coating of approximately 0.0075 inch was formed on the exterior surface of the graphite. Moreover, approximately 9% of the silicon which penetrated the graphite was converted to silicon carbide up to a depth of approximately 0.017 inch and beyond that point, began to decrease. Moreover, it can be seen that elemental silicon penetrated the graphite to approximately 0.013 inch and X-ray diffraction analysis indicated a 9.0% quantity at this depth. X-ray diffraction analysis indicated a presence of approximately 2.0% silicon carbide up to the depth of 0.0335 inch. It can thus be seen that silicon carbide was present as a greater depth than elemental silicon.

The invention is further illustrated by, but not limited to the following invention:

Example 1

This example illustrates a typical operation according to the prior art for producing and utilizing silicon-coated graphite bridges. A graphite heating element of ultra pure graphite was used in an actual operation for producing epitaxial silicon films on silicon wafers. The heating element was of the standard form normally used in epitaxial furnaces, and was generally U-shaped in horizontal cross section. Each of the legs had a length of 12 inches and were connected by a bridge of 3%6 inches. Each of the legs had a width of 1⅜ inches and a thickness of ¼ inch. The heating element was suitably positioned in an epitaxial silicon furnace, cleaned, and the furnace was evacuated to approximately 15 microns mercury pressure for approximately 30 minutes. The furnace was then purged to 2 lbs. per square inch absolute pressure. Hydrogen was then added for approximately 10 minutes while maintaining the pressure in the furnace at 2 lbs. per square inch absolute pressure. Following this, the furnace was purged for an additional 30 minutes by adding hydrogen at the rate of 18 liters per minute at atmospheric pressure.

The heating element was provided with a silicon coating by passing trichlorosilane gas into the furnace area at a rate of 0.54 g. per minute and hydrogen at a rate of 14 liters per minute, while maintaining the heating element at a temperature of 1180° C. The power supplied to the heating element was alternating electrical current having 485 amperes and 23.9 volts. The coated heating element was then cooled to room temperature and charged with 16 silicon wafers which were polished on the (1-1-1) plane, Miller's indices. The above mixture of hydrogen and trichlorosilane gases were passed into the furnace while the heating element was maintained at a temperature of 1180° C.

The epitaxial silicon layers thus formed on the wafers had a poor quality due to the development of surface imperfections on the wafers. The surface imperfections were attributed to the evolution of gases from the graphite heating element. By reference to the following table, the wafer deposition temperature can be seen as a function of the distance from the furnace electrodes. Moreover, the film resistivity and average film thickness can be seen.

| Distance From Electrode | Wafer Deposition Temperature | Film Resistivity (ohm-cm.) | Film Thickness (mils) |
| --- | --- | --- | --- |
| 3 | 1,120 | 1.65 | 0.77 |
| 4 | | | 0.71 |
| 5 | | | 0.68 |
| 6 | | | 0.70 |
| 7 | 1,154 | | 0.74 |
| 8 | | | 0.92 |
| 9 | | | 1.00 |
| 10 | 1,160 | | 0.95 |
| 10 | 1,160 | | 0.85 |
| 9 | 1,167 | | 0.77 |
| 8 | | | 0.74 |
| 7 | 1,152 | | 0.70 |
| 6 | | | 0.68 |
| 5 | | | 0.73 |
| 4 | | 1.55 | 1.22 |
| 3 | 1,125 | 1.75 | 1.18 |

Example 2

The graphite heating element used in Example 1 was mounted in the same epitaxial silicon furnace. The furnace was evacuated and the heating element was maintained at a temperature of 1180° C. in an attempt to cause additional outgassing of the heating element and thereby possibly eliminate some of the impurities contained therein. The procedure of Example 1 was then repeated and the heating element was charged with 16 additional wafers which were also highly polished on the (1-1-1) plane, Miller's indices. The epitaxial layers formed on the wafers had a poor quality and exhibited considerable cloudiness. The results of the experiment can be seen in the following table:

| Distance From Electrode | Wafer Deposition Temperature | Film Resistivity (ohm-cm.) | Film Thickness (mils) |
| --- | --- | --- | --- |
| 3 | 1,105 | 01.65 | 0.77 |
| 4 | | | 0.71 |
| 5 | | | 0.68 |
| 6 | | | 0.70 |
| 7 | 1,150 | | 0.74 |
| 8 | | | 0.92 |
| 9 | | | 1.00 |
| 10 | | | 0.95 |
| 10 | 1,147 | | 0.85 |
| 9 | | | 0.77 |
| 8 | | | 0.74 |
| 7 | 1,148 | | 0.70 |
| 6 | | | 0.68 |
| 5 | | | 0.73 |
| 4 | | 01.55 | 1.22 |
| 3 | 1,120 | 01.75 | 1.18 |

Example 3

Due to the unsatisfactory results produced in Examples 1 and 2, the heating element employed therein was returned to the manufacturer (Ultra Carbon Products Company of Bay City, Michigan) for repurification. The repurified heating element was then mounted in the same epitaxial silicon furnace where the furnace was evacuated for 20 minutes to 39 microns mercury pressure. The furnace was then purged by the addition of hydrogen for 10 minutes while maintaining the pressure at 2 lbs. per square inch absolute pressure. The furnace was further purged by adding hydrogen at a rate of 50 liters per minute for 15 minutes at atmospheric pressure. The bridge was similarly provided with a silicon coating by passing trichlorosilane into the furnace at a rate of 42 liters per minute and hydrogen at a rate of 0.54 gram per minute while maintaining the heating element at a temperature of 1180° C. The heating element when cooled, was charged with 12 highly polished silicon wafers and heated to 1150° C. Trichlorosilane was passed into the furnace area at a rate of 42 liters per minute and hydrogen was passed into the furnace simultaneously therewith at a rate of 0.54 gram per minute, for 75 minutes.

The epitaxial films thus produced exhibited a poor quality, again owing to the development of surface imperfections. The surface imperfections were similarly attributed to the evolution of gases from the heating element. The results achieved were similar to the results as illustrated in Examples 1 and 2.

The following two examples are illustrative of the present invention and show the superior benefits of this invention over the prior art processes.

Example 4

A heating element of the same design as the heating elements in Examples 1, 2 and 3 was mounted in a similar type of epitaxial silicon furnace and the preparatory procedure performed in Examples 1, 2 and 3 was followed herein. However, after originally coating the heating element with a film of silicon, the temperature of the heating element was increased to 1550° C. for 2 minutes, thereby melting the silicon and causing the latter to diffuse into the pores of the heating element. Trichlorosilane and hydrogen gases were then passed into the furnace, reacted and deposited on the heating element an additional film of silicon for 15 minutes, while maintaining a heating element temperature of 1150° C. The temperature of the heating element was then increased to 1550° C. for 2 minutes and the temperature again reduced to 1150° C. At this temperature, an additional layer of silicon was formed by the reaction of trichlorosilane and hydrogen for 90 minutes.

Thereafter, 38 silicon wafers were charged on the heating element, the above mentioned mixtures of gases passed into the furnace for 41 minutes and a coating of silicon was deposited on the wafers at a temperature of 1150° C.

The films thus produced were of good quality and displayed no cloudiness or haze. The experimental data can be seen in the following table.

| Distance From Electrode | Film Resistivity (ohm=cm.) | Film Thickness (mils) |
|---|---|---|
| 4 | 1.74 | .63 |
| 5 | 1.56 | .64 |
| 6 | 1.65 | .64 |
| 7 | 1.75 | .63 |
| 8 | 1.40 | .60 |
| 9 | 1.23 | .59 |
| 10 | 1.60 | .64 |
| 11 | 2.12 | .63 |
| 12 | 1.10 | .64 |
| 13 | 1.18 | .63 |
| 14 | 1.49 | .77 |
| 15 | 1.42 | .79 |
| 16 | 1.49 | .78 |
| 17 | 1.61 | .79 |
| 18 | 2.06 | .89 |
| 19 | 4.19 | .82 |
| 20 | .77 | .80 |
| 21 | .94 | .68 |
| 21 | 1.44 | .77 |
| 20 | 1.47 | .77 |
| 19 | 1.45 | .79 |
| 18 | 1.51 | .82 |
| 17 | 1.84 | .84 |
| 16 | 2.06 | .82 |
| 15 | 1.34 | .79 |
| 14 | 1.36 | .70 |
| 13 | 1.32 | .72 |
| 12 | 1.18 | .60 |
| 11 | 1.32 | .59 |
| 10 | 1.29 | .62 |
| 9 | 1.38 | .60 |
| 8 | 1.37 | .56 |
| 7 | 1.50 | .60 |
| 6 | 1.52 | .62 |
| 5 | 1.47 | .62 |
| 4 | 1.68 | .60 |
| 3 | 1.52 | .63 |
| 3 | 1.35 | .59 |

*Example 5*

The heating element employed in Example 4 was provided with an additional film coating of silicon in order to determine the effect upon the wafers. This heating element was similarly mounted in an epitaxial silicon furnace and after the necessary preparatory procedures were performed, trichlorosilane and hydrogen gases were passed into the furnace at a rate of 0.54 gram per minute and 14 liters per minute, respectively at 1150° C. The temperature of the bridge was increased to 1550° C. for 2 minutes with the layer of silicon thus deposited, causing the silicon to melt and penetrate the pores of the graphite. The temperature was reduced to 1150° C. where the trichlorosilane and hydrogen gases were passed into the furnace, reacted and caused an additional layer of silicon to be deposited on the graphite heating element for 1 hour. The heating element was then increased in temperature to 1150° C. for 2 minutes, where the silicon thus deposited was fused to the graphite. The bridge was then coated for an additional 1 hour at 1150° C. and the silicon thus deposited was fused at 1550° C. for 2 minutes. Following this, an additional coating of silicon was deposited on the heating element for 1 hour at 1150° C.

Twelve highly polished wafers were charged on the heating element where a silicon film was deposited on the wafers at a temperature of 1140° C. for 42 minutes. The films thus produced had a good quality, and exhibited very little surface imperfections. The condition of the films can be seen from the following table.

TABLE I

| Distance From Electrodes (Inches) | Film Resistivity (ohm-cm.) | Average Film Thickness (0.001″) |
|---|---|---|
| 5 | 61.8 | 0.60 |
| 6 | 57.5 | 0.64 |
| 10 | 57.0 | 0.84 |
| 14 | 47.9 | 0.71 |
| 20 | 50.7 | 0.79 |
| 21 | 53.1 | 0.81 |
| 21 | 50.2 | 0.77 |
| 20 | 45.9 | 0.71 |
| 14 | 53.2 | 0.63 |
| 10 | 54.6 | 0.64 |
| 6 | 55.4 | 0.66 |
| 5 | 55.1 | 0.59 |

X-ray diffraction analysis of the heating elements employed in Examples 4 and 5 disclosed the formation of a considerable amount of beta silicon carbide.

It should be understood, that changes and modifications in the form, construction, arrangement and combination of the parts presently described and pointed out could be made and substituted for those herein shown without departing from the nature of my invention.

Having thus described my invention, what I desire to claim and secure by Letters Patent is:

1. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to crystallize on the surface of said heating element, and melting said elemental silicon whereby the silicon will penetrate the graphite and become bonded thereto.

2. The method of treating graphite heating elements and the like, said method comprising placing said heating element in an enclosed chamber, passing electrical current through said heating element to raise the temperature thereof, to at least 1140° C., causing elemental silicon to be vapor deposited on the entire exposed surface of said heating element, permitting the silicon to crystallize, and melting said elemental silicon whereby the silicon will penetrate the graphite and become bonded thereto.

3. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the temperature of said heating element above the melting point of silicon thereby causing the silicon to melt and penetrate the graphite where it becomes bonded thereto, lowering the temperature of said heating element, and causing another layer of elemental silicon to be vapor deposited on the entire exposed surface of said heating element.

4. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the current passing through said heating element to raise the temperature thereof to a range of 1420° C. to 2000° C. thereby causing the silicon to melt and penetrate the graphite where it becomes bonded thereto, lowering the temperature of said heating element, and causing another layer of elemental silicon to be vapor deposited on the entire exposed surface of said heating element.

5. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the current passing through said heating element to raise the temperature thereof to a range of 1420° C. to 2000° C. thereby causing the silicon to melt and penetrate the graphite where it becomes bonded thereto, lowering the temperature of said heating element to a temperature of not less than 1100° C., and causing another layer of elemental silicon to be vapor deposited on the entire exposed surface of said heating element.

6. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the current passing through said heating element to raise the temperature thereof to a range of 1500° C. to 1550° C. thereby causing the silicon to melt and penetrate the graphite where it becomes bonded thereto, lowering the temperature of said heating element to a temperature of not less than 1100° C., and causing another layer of elemental silicon to be vapor deposited on the entire exposed surface of said heating element.

7. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the temperature thereof above the melting point of silicon thereby causing the silicon to melt and penetrate the graphite where it becomes bonded thereto, lowering the temperature of said heating element, causing another layer of elemental silicon to be vapor deposited on the entire exposed surface of said heating element, permitting said last named layer to condense and crystallize on the surface of the heating element melting said last named layer of silicon so that the silicon will penetrate the graphite and become bonded thereto, and causing another layer of elemental silicon to be vapor deposited on the entire exposed surface of said heating element.

8. The method of treating graphite heating elements and the like, said method comprising placing said heating element in an enclosed chamber, passing electrical current through said heating element to raise the temperature thereof, causing elemental silicon to be vapor deposited on the entire exposed surface of said heating element, permitting the silicon to condense and crystallize on the surface of the heating element, increasing the temperature thereof above the melting point of silicon thereby causing the silicon to melt and penetrate the graphite where it becomes bonded thereto, lowering the temperature of said heating element, causing another layer of elemental silicon to be vapor deposited on the entire exposed surface of said heating element, melting said last named layer of silicon so that the silicon will penetrate the graphite and become bonded thereto, causing a third layer of elemental silicon to be vapor deposited on the entire exposed surface of said heating element, melting said last named layer of silicon so that the silicon will penetrate the graphite and become bonded thereto, and causing a fourth layer of elemental silicon to be vapor deposited on the entire exposed surface of said heating element.

9. Method for the preparation of graphite heating elements which comprises vapor depositing elemental silicon on the entire exposed surface of a graphite base at a first temperature below the melting point of silicon, permitting the silicon to crystallize on the surface of said graphite base, increasing the temperature of said graphite base to above the melting point of silicon to diffuse a portion of said silicon into said graphite base.

10. Method for the preparation of heating elements which comprises applying a coating of elemental silicon in a vapor state to a graphite prototype of said heating elements at a temperature below the melting point of silicon, permitting the silicon to crystallize on the surface of said graphite prototype, increasing the temperature of said graphite prototype to at least the melting point of silicon for a time sufficient to diffuse silicon into said graphite and form a gas-impervious layer of silicon fused to said graphite prototype.

11. A heating element formed of carbonaceous resistance material for epitaxial deposition furnaces and the like, said heating element having a uniformly distributed gas impervious coating of elemental silicon vapor deposited thereon and being fused thereto, said coating being in a polycrystalline state and having a definite and appreciable thickness which covers the entire exposed surface of said heating element.

12. A graphite heating element for epitaxial silicon deposition furnaces and the like, said heating element having a coating of elemental silicon vapor deposited thereon and being fused to the heating element, and a coating of silicon carbide formed by the reaction of the vapor deposited silicon with the heating element and being fused thereto, said coating being in a polycrystalline state and having a definite and appreciable thickness which covers the entire exposed surface of said heating element.

13. A heating element for epitaxial silicon deposition furnaces and the like, said heating element having a uniformly distributed gas impervious coating of elemental silicon vapor deposited thereon and being fused thereto, said coating covering the entire exposed surface of said heating element, said coating being in a polycrystalline state and having a film thickness of not less than 0.003 inch and not more than 0.0085 inch.

14. A graphite heating element for epitaxial silicon deposition furnaces and the like, said heating element having a uniformly distributed gas impervious coating of elemental silicon vapor deposited thereon and being fused thereto, said coating being in a polycrystalline state and having a definite and appreciable thickness which covers the entire exposed surface of said heating element, said coating having a penetration into the graphite of at least 100 microns.

15. A graphite heating element for epitaxial silicon deposition furnaces and the like, said heating element having a uniformly distributed gas impervious coating of elemental silicon vapor deposited on the entire exposed surface of said heating element and being fused thereto, said coating being in a polycrystalline state and covering the entire exposed surface of said heating element, said coating having a penetration into the graphite of at least 0.005 inch and a film thickness measured from the surface of the graphite to the exterior surface of the coating of at least 0.003 inch.

16. A graphite heating element for epitaxial silicon deposition furnaces, said heating element having a uniformly distributed gas impervious coating of elemental silicon vapor deposited on the entire exposed surface of said heating element and being fused thereto, said coating being in a polycrystalline state and having a definite and appreciable thickness which covers the entire exposed surface of said heating element, said coating having an electrical resistivity of at least 30 ohm centimeters.

(References on following page)

References Cited

UNITED STATES PATENTS

| | | | |
|---|---|---|---|
| 2,938,772 | 5/1960 | Enk et al. | 23—223.5 |
| 2,992,127 | 7/1961 | Jones | 11?—?28 X |
| 3,164,489 | 1/1965 | Timper | 117—212 |
| 3,265,528 | 8/1966 | Bond | 117—95 |

FOREIGN PATENTS 407,111  12/1924  Germany.

ALFRED L. LEAVITT, *Primary Examiner.*

WILLIAM L. JARVIS, *Examiner.*